United States Patent
Eguchi et al.

(10) Patent No.: US 12,125,414 B2
(45) Date of Patent: Oct. 22, 2024

(54) LIGHT-EMITTING DISPLAY SHEET, LIGHT-EMITTING DISPLAY MEMBER, LIGHT-EMITTING DISPLAY DEVICE, AND METHOD FOR PRODUCING LIGHT-EMITTING DISPLAY MEMBER

(71) Applicant: KURARAY CO., LTD., Kurashiki (JP)

(72) Inventors: Daisuke Eguchi, Tokyo (JP); Toshiyuki Ito, Tokyo (JP); Tatsuya Daimon, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 3 days.

(21) Appl. No.: 17/906,343

(22) PCT Filed: Mar. 16, 2021

(86) PCT No.: PCT/JP2021/010524
§ 371 (c)(1),
(2) Date: Sep. 14, 2022

(87) PCT Pub. No.: WO2021/187458
PCT Pub. Date: Sep. 23, 2021

(65) Prior Publication Data
US 2023/0120727 A1  Apr. 20, 2023

(30) Foreign Application Priority Data
Mar. 18, 2020 (JP) ................ 2020-047562

(51) Int. Cl.
*B32B 3/10* (2006.01)
*B32B 5/02* (2006.01)
(Continued)

(52) U.S. Cl.
CPC .............. *G09F 13/08* (2013.01); *B32B 5/022* (2013.01); *B32B 7/023* (2019.01); *B32B 7/12* (2013.01);
(Continued)

(58) Field of Classification Search
None
See application file for complete search history.

(56) References Cited

U.S. PATENT DOCUMENTS

| 4,180,934 A | 1/1980 | Cohen |
| 11,286,693 B2 | 3/2022 | Hama et al. |
| 2019/0073055 A1* | 3/2019 | Nakai ................ B32B 15/20 |

FOREIGN PATENT DOCUMENTS

| JP | 2005-319585 | 11/2005 |
| JP | 2013-76295 | 4/2013 |

(Continued)

OTHER PUBLICATIONS

Machine translation of JP-2013076295-A (Year: 2013).*
(Continued)

*Primary Examiner* — Christopher M Polley
(74) *Attorney, Agent, or Firm* — Grüneberg and Myers PLLC

(57) ABSTRACT

A light-emitting display sheet includes a first fiber base material layer and a surface material layer stacked on the first fiber base material layer. The first fiber base material layer includes a first surface facing the surface material layer, and a second surface opposite to the first surface. The light-emitting display sheet further includes a print portion having an outline and sandwiched between the first surface of the first fiber base material layer and the surface material layer.

18 Claims, 7 Drawing Sheets

(51) Int. Cl.
 *B32B 7/023* (2019.01)
 *B32B 7/12* (2006.01)
 *B32B 27/12* (2006.01)
 *B32B 27/40* (2006.01)
 *G09F 13/08* (2006.01)

(52) U.S. Cl.
 CPC .............. *B32B 27/12* (2013.01); *B32B 27/40* (2013.01); *B32B 2260/021* (2013.01); *B32B 2260/046* (2013.01); *B32B 2262/0284* (2013.01); *B32B 2307/412* (2013.01); *B32B 2307/72* (2013.01)

(56) References Cited

FOREIGN PATENT DOCUMENTS

| | | | |
|---|---|---|---|
| JP | 2013076295 A | * | 4/2013 |
| JP | 2013-177714 | | 9/2013 |
| JP | 2014-173203 | | 9/2014 |
| JP | 2016-81817 | | 5/2016 |
| JP | 2017-133133 | | 8/2017 |
| WO | 2020/213293 | | 10/2020 |

OTHER PUBLICATIONS

International Search Report dated May 25, 2021, in PCT/JP2021/010524, with English translation, 6 pages.
Written Opinion dated May 25, 2021, in PCT/JP2021/010524, with English translation, 14 pages.

\* cited by examiner

LIGHT-EMITTING DISPLAY SHEET, LIGHT-EMITTING DISPLAY MEMBER, LIGHT-EMITTING DISPLAY DEVICE, AND METHOD FOR PRODUCING LIGHT-EMITTING DISPLAY MEMBER

CROSS-REFERENCE TO RELATED APPLICATIONS

This application is the National Stage entry under § 371 of International Application No. PCT/JP2021/010524, filed on Mar. 16, 2021, and which claims the benefit of priority to Japanese Application No. 2020-047562, filed on Mar. 18, 2020. The content of each of these applications is hereby incorporated by reference in its entirety.

TECHNICAL FIELD

The present invention relates to a light-emitting display sheet that displays a symbol such as a character and an icon, a pattern, and/or an image with light emission or without light emission by transmitting light from a light-emitting device therethrough.

BACKGROUND ART

In recent years, a light-emitting display device has been proposed in which a light-emitting device is covered by a light-transmissive sheet, and a symbol such as a character and an icon, a pattern, and/or an image or the like is displayed on the surface by transmitting light from the light-emitting device therethrough.

For example, PTL 1 listed below discloses a synthetic leather including a raw fabric, and a skin layer that is made of a polyurethane resin and is stacked on the raw fabric, wherein a portion of the synthetic leather has a visible light transmittance of 0.10 to 11.90% for a wavelength range of 380 to 780 nm. Also, PTL 1 discloses that, in order to partially form a light-blocking region, cardboard cut out in a desired shape is, for example, attached, sewn, hooked, or welded to the underside of the raw fabric.

PTL 2 listed below discloses a light-transmissive artificial leather sheet in which a transparent or semi-transparent elastomer sheet is used. Specifically, PTL 2 discloses a light-transmissive artificial leather sheet wherein a smoke print layer is provided on a back surface or a front surface of the elastomer sheet, a mask print layer for causing a character, a figure, a pattern, or a design including a combination thereof to emerge is provided on an outermost layer that is the back surface of the elastomer sheet, and irregularities in a leather-like pattern are formed on the front surface of the elastomer sheet.

PTL 3 listed below discloses a leather-like light-emitting sheet including a light-emitting device, and a light-transmissive leather-like sheet including a fiber base material, wherein the light-transmissive leather-like sheet is disposed so as to cover the light-emitting device, and light emitted from the light-emitting device is transmitted through a light-transmitting portion formed in at least one region in a surface thereof. Also, PTL 3 discloses that a fiber base material that includes a non-woven fabric of ultrafine fibers having a fineness of 0.8 dtex or less and an elastic polymer, and that has an apparent density of 0.5 g/cm$^3$ or more is dense and thus has excellent dimensional stability, and the fiber base material is preferable because it is excellent in ease of high-precision processing when a thinned portion that is cut to be thinner than a region corresponding to a non-light-transmitting portion is formed in a region corresponding to the light-transmitting portion. PTL 3 also discloses that a light-blocking layer is formed by coating the fiber base material with a coating liquid containing a colorant, and drying the coating liquid.

CITATION LIST

Patent Literatures

[PTL 1] Japanese Laid-Open Patent Publication No. 2013-177714
[PTL 2] Japanese Laid-Open Patent Publication No. 2014-173203
[PTL 3] Japanese Laid-Open Patent Publication No. 2016-081817

SUMMARY OF INVENTION

Technical Problem

In order to form a partial light-blocking region on a fiber base material, a method can be proposed in which a print portion serving as a light-blocking portion is formed on one surface of the fiber base material by being printed with an ink. With such a method, it is possible to easily produce a light-emitting display sheet that can be used as a member of a light-emitting display device that displays a symbol such as a character and an icon, a pattern, or an image with light emission.

However, when such a light-emitting display sheet is accommodated in a mold, and is subjected to in-mold decorative injection molding in order to integrate the light-emitting display sheet with a light-transmissive injection-molded body, the print portion printed on the fiber base material and the molten resin for injection molding may come into contact, as a result of which the print portion is melted, and the outline of the print portion is deformed. Accordingly, the outline of a character, a symbol, a pattern, an image, or the like displayed with light emission may be obscure.

It is an object of the present invention to provide a light-emitting display sheet wherein, when a light-emitting display sheet including a print portion printed thereon is accommodated in a mold, and subjecting the light-emitting display sheet to in-mold decorative injection molding, the outline of a print portion is less likely to be deformed.

Solution to Problem

An aspect of the present invention is directed to a light-emitting display sheet including: a first fiber base material layer; and a surface material layer stacked on the first fiber base material layer, wherein the first fiber base material layer includes a first surface facing the surface material layer, and a second surface opposite to the first surface, and the light-emitting display sheet further includes a print portion having an outline and sandwiched between the first surface of the first fiber base material layer and the surface material layer. When such a light-emitting display sheet is combined with a light-emitting device (light-emitting member) and used as a light-emitting display device, the print portion having an outline selectively blocks the light emitted by the light-emitting device, and a non-print portion adjacent to the print portion selectively transmits the light, thus displaying the shape of a symbol, a pattern, or a design with light emission or without light emission. When the light-emitting device is turned off, the surface material layer makes the first fiber base material layer less visible from the outside. Also, when the light-emitting display sheet is accommodated in a mold, and is subjected to in-mold decorative injection molding in order to integrate the light-emitting display sheet with a light-transmissive injection-molded body, the print portion is less likely to come into direct contact with the molten resin since the print portion is sandwiched between the first surface and the surface material layer. Accordingly, it is possible to prevent a situation where the print portion is melted by the heat and the pressure applied during injection molding, and the outline thereof is deformed. As a result, the outline of the print portion that displays a pattern or the like is maintained without being deformed, so that the outline of light emission display becomes clear, and the contrast between an emitting portion and a non-emitting portion is increased. As a side benefit, when forming a light-emitting display member, the first fiber base material layer relieves the pressure of an injection-molded resin during injection-molding, thus making it easy to maintain the tactile impression of the surface material layer. In addition, the molten resin for injection molding infiltrates into the first fiber base material layer, and thus the bonding strength is increased by an anchor effect. Furthermore, the first fiber base material layer diffuses the transmitted light, and thus reduces color variation of light emission.

It is preferable that the first fiber base material layer and the surface material, layer are bonded to each other via an adhesion layer, because the print portion is protected by the adhesion layer.

It is preferable that the print portion is formed on the first surface, because of the excellent productivity since various print portions can be formed simply by printing them on the first fiber base material layer.

It is preferable that the first surface has an arithmetic mean height Sa of 3 to 20 μm, as measured based on ISO 25178, because a dense surface can be formed, and therefore a smooth surface suitable for printing can be obtained, the ink is less likely to be diffused, and a print portion with little coating unevenness and a clear outline is likely to be formed.

It is preferable that the first fiber base material layer includes a fiber base material that includes a non-woven fabric of ultrafine fibers having an average fineness of 1.0 dtex or less, and an elastic polymer impregnated into the non-woven fabric, and that has an apparent density of 0.3 g/cm$^3$ or more, because a smooth surface suitable for printing can be formed, and therefore a print portion having a clear outline can be formed. This is also preferable because excellent shape stability is achieved, and therefore the print portion is likely to retain its shape.

It is preferable that the surface material layer includes a second fiber base material layer, and the print portion is sandwiched between the first fiber base material layer and the second fiber base material layer, because the print portion is sandwiched and protected between the two fiber base material layers having cushioning properties, and therefore the print portion is likely to retain its shape.

It is preferable that the surface material layer further includes a decoration layer stacked on an outer surface side of the second fiber base material layer, because the appearance can be provided with a design quality.

It is preferable that the decoration layer is a leather grain-like resin layer, because a grain-finished leather-like light-emitting display sheet can be obtained.

Specific examples of the surface material layer include a layer formed of a surface material, including, for example, a textile material such as a non-woven fabric, a woven fabric, and a knitted fabric; a wood sheet such as a sheet of sliced veneer obtained by thinly slicing natural wood; a stone sheet having a light transmitting property such as a thin slice of stone and jade; a metal sheet such as a metal foil; a resin sheet such as a polyvinyl chloride sheet, a polyurethane sheet, and a PET sheet. The surface material layer may be a napped leather-like sheet obtained by napping the fibers on the outer surface side of the second fiber base material layer.

Yet another aspect of the present invention is directed to a light-emitting display member including the above-described light-emitting display sheet; and a light-transmissive resin layer integrated on the second surface side. It is preferable that the light-transmissive resin layer is an injection-molded body.

Still another aspect of the present invention is directed to a light-emitting display device including the above-described light-emitting display member; and a light-emitting device disposed on the light-transmissive resin layer side.

Still yet another aspect of the present invention is directed to a method for producing a light-emitting display member, the method including the steps of: accommodating the above-described light-emitting display sheet in a cavity of an injection-molding mold, and clamping the mold; and injection molding a light-transmissive resin layer, thereby integrating the light-transmissive resin layer on the second surface side of the first fiber base material layer that forms the light-emitting display sheet accommodated in the injection-molding mold.

Advantageous Effects of Invention

According to the present invention, it is possible to provide a light-emitting display sheet wherein, when a light-emitting display sheet including a print portion printed thereon is accommodated in a mold, and subjecting the light-emitting display sheet to in-mold decorative injection molding, the outline of a print portion is less likely to be deformed.

DESCRIPTION OF EMBODIMENT 1

Embodiments of a light-emitting display sheet, a light-emitting display member, a light-emitting display device, and a method for producing the light-emitting display member according to the present invention will be described with reference to the drawings. Note that the drawings are schematic views for illustrating features of the present invention, and, for the sake of convenience of description, dimensions and scales have not been taken into consideration.

Light-Emitting Display Sheet)

An embodiment of the light-emitting display sheet will be described below. The light-emitting display sheet according to the present embodiment includes a first fiber base material layer, and a surface material layer stacked on the first fiber base material layer, and further includes a print portion having an outline and sandwiched between the first fiber base material layer and the surface material layer. Also, the print portion serves as a light-blocking portion, and a non-print portion adjacent to the print portion serves as a light-transmitting portion.

Figure 1:
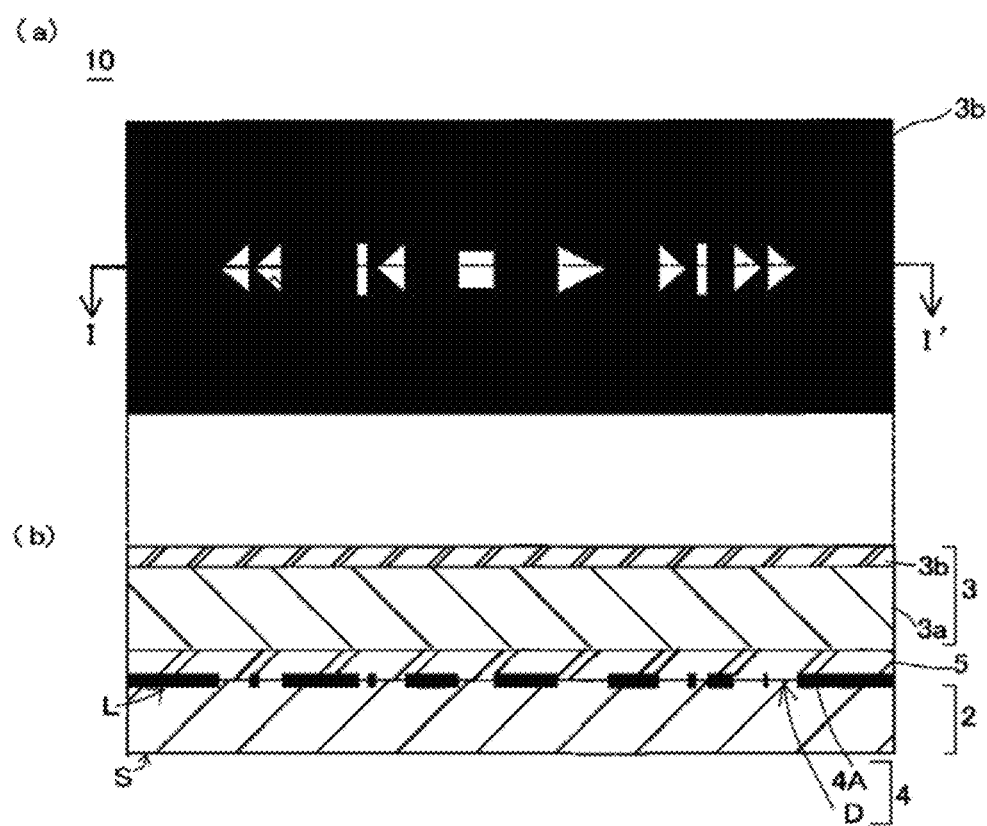
FIG. 1 shows schematic views of a light-emitting display sheet 10 according to an embodiment.

FIG. 1 shows schematic views of a light-emitting display sheet 10 according to an embodiment of the light-emitting display sheet of the present embodiment. FIG. 1(a) is a schematic plan view of the light-emitting display sheet 10, and FIG. 1(b) is a schematic cross-sectional view taken along the line I-I' in FIG. 1(a). The light-emitting display sheet 10 includes a first fiber base material layer 2, a surface material layer 3 including a second fiber base material layer 3a, and a decoration layer 3b, an adhesion layer 5 that bonds the first fiber base material, layer 2 and the second fiber base material layer 3a to each other, and a print portion 4A.

The surface material layer 3 in the present embodiment is an artificial leather obtained by stacking a resin layer serving as the decoration layer 3b on the second fiber base material layer 3a. Also, the first fiber base material layer 2 and the second fiber base material layer 3a are bonded to each other via the adhesion layer 5.

The first fiber base material layer 2 includes a first surface L facing the surface material layer 3, and a second surface S opposite to the first surface L. Also, the print portion 4A having an outline is formed so as to be sandwiched between the first fiber base material layer 2 and the second fiber base material layer 3a. The print portion 4A is adjacent to an unprinted non-print portion D that transmits light therethrough. The print portion 4A and the non-print portion D form a print layer 4. Note that the outline in the present embodiment means a boundary line between the print portion and the non-print portion.

Each of the fiber base material layers includes a fiber base material that includes a fiber structure such as a non-woven fabric, a woven fabric, or a knitted fabric, and into which an elastic polymer is impregnated into voids of the fiber structure if necessary. The average fineness of the fibers forming the fiber structure is not particularly limited, but is preferably 1.5 dtex or less, more preferably 1.0 dtex or less, and particularly preferably 0.9 dtex or less, because a fiber base material layer having a high denseness and a smooth surface is likely to be obtained. Note that the average fineness can be calculated by taking a scanning electron microscope (SEM) photograph of a cross section of each of the fiber base material layers at a magnification of 500×, measuring the cross-sectional areas of 10 randomly selected fiber cross sections, calculating an average value of the cross-sectional areas, and converting the value into a fineness based on the densities of the resins.

When an elastic polymer is impregnated into the voids of the fiber structure, the type of the elastic polymer impregnated is not particularly limited. Specific examples thereof include various polyurethanes such as a polycarbonate-based polyurethane, a polyester-based polyurethane, and a polyether-based polyurethane, acrylic elastic bodies, polyurethane acrylic composite elastic bodies, polyvinyl chloride, and synthetic rubbers. Among these, polyurethanes are preferable because of the excellent adhesion and mechanical properties.

The thickness of the first fiber base material layer 2 and the second fiber base material layer 3a is not particularly limited, but is preferably 0.1 to 1 mm, and more preferably 0.35 to 0.8 am. Also, the apparent density of the fiber base material layers is not particularly limited, but is preferably 0.3 g/cm$^3$ or more, more preferably 0.50 to 0.95 g/cm$^3$, and particularly preferably 0.50 to 0.90 g/cm$^3$, because the ink easily adheres to the fiber base material layers during printing, and a print portion having a clear outline is likely to be formed.

As for the light transmission of the fiber base material layers, the arithmetic mean value of transmittance for a visible wavelength range of 380 to 780 nm is preferably 0.1% or more, more preferably 1% or more, particularly preferably 5% or more, and quite particularly preferably 10% or more.

The surface material layer is a layer having a light transmitting property that is used for forming an outer surface of the light-emitting display sheet. Examples of the surface material layer include a leather-like sheet such as an artificial leather or a synthetic leather obtained by stacking a resin layer on the second fiber base material layer as a decoration layer as described above; a napped leather-like sheet obtained by napping fibers on the outer surface side of the second fiber base material, layer; a textile material such as a non-woven fabric, a woven fabric, and a knitted fabric; a wood sheet such as a sliced veneer obtained by thinly slicing natural wood; a stone sheet having a light transmitting property such as a thin slice of stone and jade; a metal sheet such as a metal foil; and a resin sheet such as a polyvinyl chloride sheet, a polyurethane sheet, and a PET sheet. These may be used alone, ox in a combination of two or more.

The surface material layer preferably includes a decoration layer that is colored with a pigment or a dye, in order to make the inner layers less visible from the outside when a light-emitting device is turned off. The decoration layer may be a layer that is colored so as to have an appearance with a luxurious feel such as a grain-finished leather-like feel, a wooden feel, a stony feel, and a metallic feel. The thickness of the decoration layer is not particularly limited, but is preferably about 20 to 500 μm.

The thickness of the surface material layer is not particularly limited, but is, for example, preferably about 10 to 1000 μm, and more preferably about 20 to 500 μm.

The light transmission of the surface material layer is preferably such that the arithmetic mean value of transmittance for a visible wavelength range of 380 to 780 nm is preferably 0.1% or more, more preferably 1.0% or more, particularly preferably 5.0% or more, and quite particularly preferably 10% or more. The upper limit is not particularly limited, but is preferably 90%, more preferably 80%, and particularly preferably 50%.

As shown in FIG. 1, in the light-emitting display sheet 10, the print layer 4, which includes the print portion 4A printed so as to have an outline, and the non-print portion D adjacent to the print portion 4A, is sandwiched between the first fiber base material layer 2 and the second fiber base material layer 3a. The print portion 4A serves as a light-blocking portion, and the non-print portion D serves as a light-transmitting portion. Using the outline shape of the print portion 4A, symbols such as a character and an icon, patterns, or images are displayed with light emission.

The print portion serves as a light-blocking portion, and therefore has a lower light transmittance than the non-print portion serving as a light-transmitting portion. As for the light transmission in a region of the light-emitting display sheet that corresponds to the print portion that blocks light, the arithmetic mean value of transmittance for a visible wavelength range of 380 to 780 nm is preferably 0.09% or less, and more preferably 0.02% or less. When the light transmittance in the region of the light-emitting display sheet that corresponds to the print portion is high, symbols such as a character and an icon, patterns, or images that are displayed with light emission tend to be obscure. As for the light transmission in a region of the light-emitting display sheet that corresponds to the non-print portion that transmits light, the arithmetic mean value of transmittance for 360 to 780 nm is preferably 0.1 to 30%, and more preferably 0.1 to 12%. Note that the light transmission of the light-emitting display sheet is determined by measuring transmittances for a visible wavelength range of 380 to 780 nm using a spectrophotometer U-4100 (Hitachi High-Tech Science Corporation), and calculating the average value thereof.

As shown in FIG. 1, the non-print portion D having an outline is formed so as to be adjacent to the print portion 4A having an outline. The non-print portion D is shaped to form shapes of icons indicating operation states of an audio device, such as pause, playback, skip forward, skip back, fast forward, and reverse. The non-print portion D is not limited to shapes of icons as shown in FIG. 1, and may have any other shapes, including, for example, symbols such as other icons or characters, a pattern, and a design without any limitation.

The print portion is formed by being printed using a pigment ink containing a pigment having a high concealing effect, such as carbon black or titanium oxide, and a binder, or a dye ink containing a dark color dye having a light-blocking effect. Specifically, the print portion is formed on a surface or the like of the first fiber base material layer 2 or the second fiber base material layer 3a by being printed with an ink. In terms of productivity, it is preferable that the print portion is formed on the first fiber base material layer 2 by being printed using an ink.

The softening temperature of the resin for forming the print portion is preferably 80% C or more, and more preferably 100° C. or more.

The thickness of the print portion is preferably about 5 to 80 μm, and more preferably about 20 to 50 μm.

In the light-emitting display sheet 10, the first fiber base material layer 2 and the surface material layer 3 that sandwich the print portion 4A therebetween are bonded to each other by the adhesion layer 5. Such a configuration is preferable in that the print portion 4A is protected by the adhesion layer 5. The thickness of the adhesion layer is not particularly limited, but is preferably about 50 to 200 μm, for example. To form the adhesion layer, it is preferable to use a hot-melt adhesive, for example. When bonding the first fiber base material layer 2 and the surface material layer 3 to each other, bubbles are less likely to remain in the bonded portion since the first fiber base material layer 2 have voids between the fibers.

Figure 2:
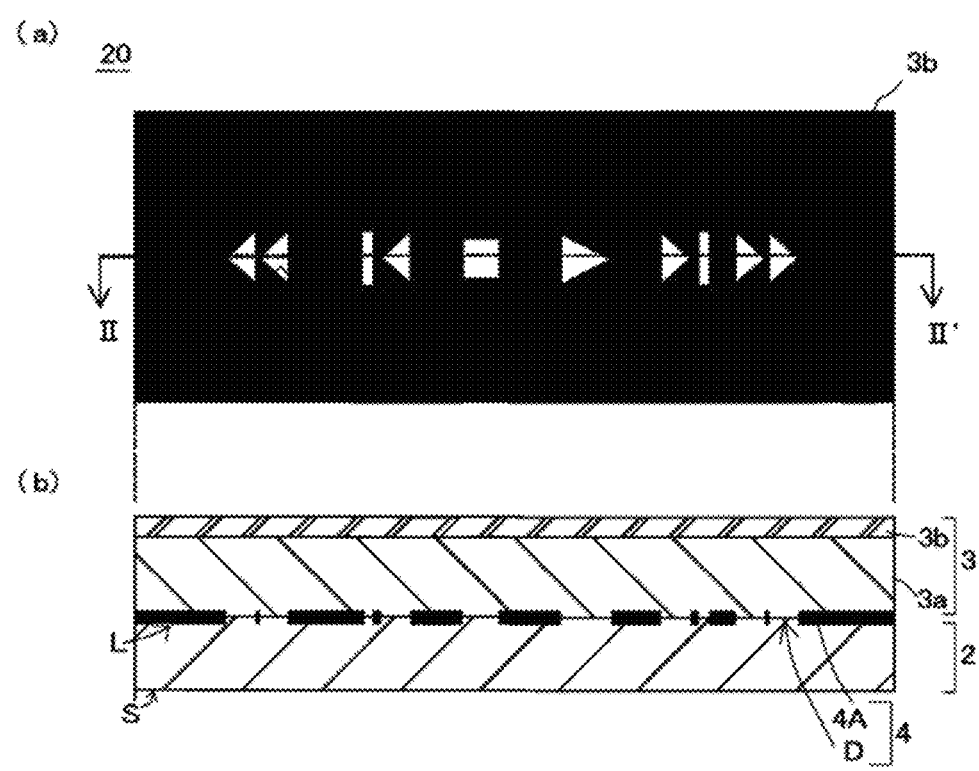
FIG. 2 shows schematic views of a light-emitting display sheet 20 according to an embodiment.

The first fiber base material layer 2 and the surface material layer 3 may be bonded to each other by being subjected to thermocompression bonding, without any adhesion layer interposed therebetween. FIG. 2 shows schematic views of a light-emitting display sheet 20 in which the first fiber base material layer 2 and the second fiber base material layer 3a that forms the surface material layer 3 are thermocompression bonded to each other. FIG. 2(a) shows a schematic plan view of the light-emitting display sheet 20, and FIG. 2(b) shows a schematic cross-sectional view taken at the line II-II' in FIG. 2(a).

The light-emitting display sheet described thus far is used in production of a light-emitting display member, which will be described next, in which a resin molded body having a light transmitting property is integrated with the second surface S of the first fiber base material layer 2.

Light-Emitting Display Member)

An embodiment of a light-emitting display member will be described below. The light-emitting display member according to the present embodiment includes the above-described light-emitting display sheet, and a light-transmissive resin layer integrated on the second surface side of the first fiber base material layer of the light-emitting display sheet.

Figure 3:
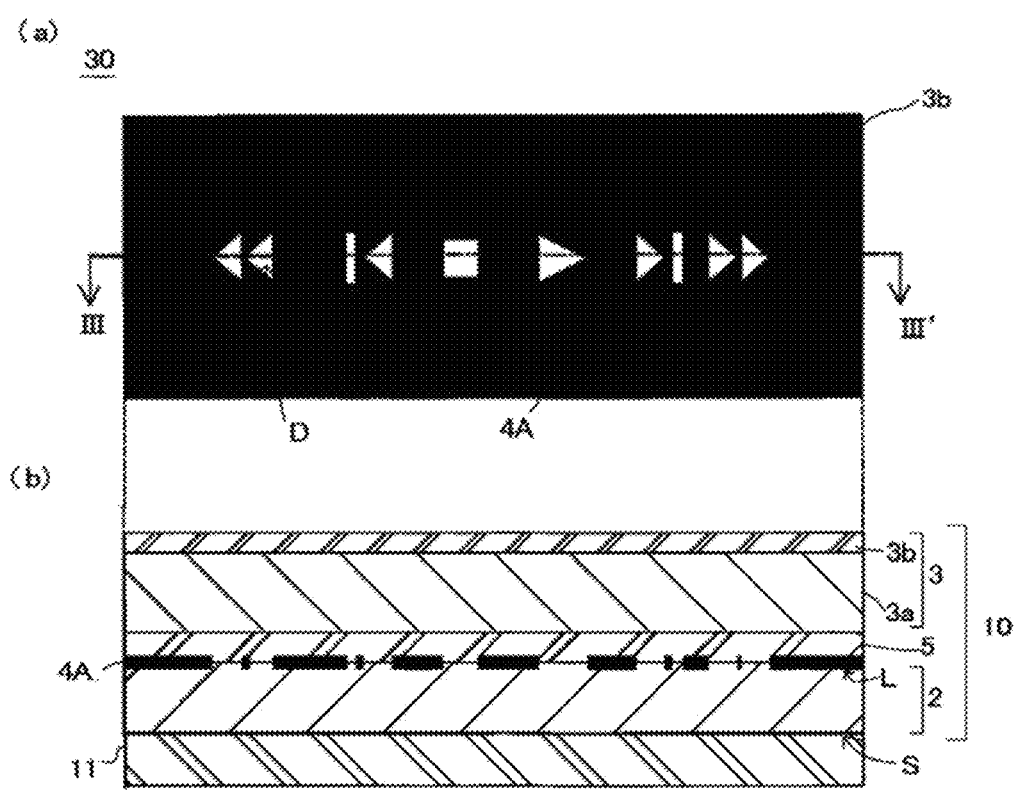
FIG. 3 shows schematic views of a light-emitting display member 30 according to an embodiment.

FIG. 3 shows schematic views of a light-emitting display member 30 in which the light-emitting display sheet 10 shown in FIG. 1 is used. FIG. 3(a) shows a schematic plan view of the light-emitting display member 30, and FIG. 3(b) shows a schematic cross-sectional view taken at the line III-III' in FIG. 3(a).

As shown in FIG. 3, the light-emitting display member 30 includes the light-emitting display sheet 10, and a light-transmissive resin layer 11 integrated with the second surface S of the first fiber base material layer 2 of the light-emitting display sheet 10. That is, in the Light-emitting display member 30, the light-transmissive resin layer 11 is integrated on the second surface S side of the first fiber base material layer 2 that forms the light-emitting display sheet 10. Also, a surface layer of the light-transmissive resin layer 11 infiltrates a surface layer of the second surface S of the first fiber base material, layer.

The light-transmissive resin layer 11 is preferably molded by in-mold decorative injection molding using injection molding. As the resin for forming the light-transmissive resin layer, any resin having a light transmitting property can be used without any particular limitation. Specific examples of the resin for forming the light-transmissive resin layer include acrylic resins such as an MBS-based resin (methyl methacrylate-butadiene-styrene copolymer resin), an ABS-based resin, and a PMMA resin; polystyrene-based resins; polycarbonate-based resins; polyolefin-based resins such as polypropylene; polyester-based resins such as polyethylene terephthalate (PET) and polybutylene terephthalate (PBT); various polyamide-based resins; and cycloolefin polymer (COP) resins. These may be a compound article with which a filler or the like is mixed, or a mixture article in which a plurality of kinds of resins are alloyed or blended. The thickness of the light-transmissive resin layer is not particularly limited, but is, for example, preferably 0.3 to 3.0 mm, and more preferably 0.5 to 2.0 mm.

As for the light transmission of the light-transmissive resin layer, the arithmetic mean value of transmittance for a visible wavelength range of 380 to 780 nm is preferably 10% or more, more preferably 50% or more, and particularly preferably 90% or more.

A method for producing a light-emitting display member using in-mold decorative injection molding will be described in detail below. The method for producing a light-emitting display member includes the steps of: accommodating the above-described light-emitting display sheet in a cavity of an injection-molding mold, and clamping the mold; and injection molding a light-transmissive resin layer, thereby integrating the light-transmissive resin layer on the second surface side of the first fiber base material layer that forms the light-emitting display sheet accommodated in the injection-molding mold.

With reference to FIGS. 4A to 4D, a detailed description will be given below of a method for producing, by in-mold decorative injection molding using the above-described light-emitting display sheet 10, a light-emitting display member 30 in which a light-transmissive resin layer 11 that is injection-molded is integrated with the second surface S of the first fiber base material layer 2 that forms the light-emitting display sheet 10.

In FIGS. 4A to 4D, reference numeral 10 denotes a light-emitting display sheet, reference numeral 12a denotes a movable mold, reference numeral 12b denotes a fixed mold, reference numeral 13 denotes an injection portion body of an injection molding machine, reference numeral 13a denotes a nozzle, reference numeral 13b denotes a cylinder, reference numeral 13c denotes an in-line screw, reference numeral 14 denotes a resin inlet, reference numeral 11 denotes a light-transmissive resin layer, reference numeral 1 la denotes molten resin, and reference numeral 30 denotes a light-emitting display member. The movable mold 12a and the fixed mold 12b, as a pair, constitute an injection molding mold 12 for forming a cavity c. Note that, in the present embodiment, the movable mold 12a is a female mold of the injection molding mold, and the fixed mold 12b is a male mold of the injection molding mold.

Figure 4A:
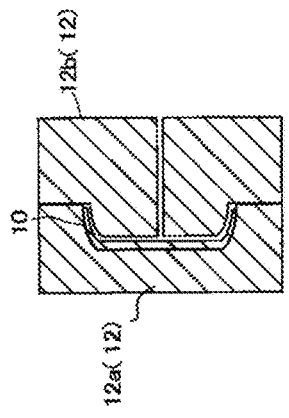
FIGS. 4A to 4D show explanatory views illustrating a method for producing the light-emitting display member 30 by in-mold decorative injection molding.

First, as shown in FIG. 4A, the light-emitting display sheet 10 is accommodated in a recess for forming the cavity of the movable mold 12a. At this time, the second surface S side of the first fiber base material layer 2 is disposed in a direction in which the molten resin 1 la is filled. In the present embodiment, the description is given of an example in which a light-emitting display sheet 1 that has been preform molded into a deep-drawn shape in advance so as to conform to the shape of the cavity c of the injection molding mold 12 is used. However, the light-emitting display sheet 10 may be subjected to in-mold decorative injection molding without performing preform molding.

Figure 4B:
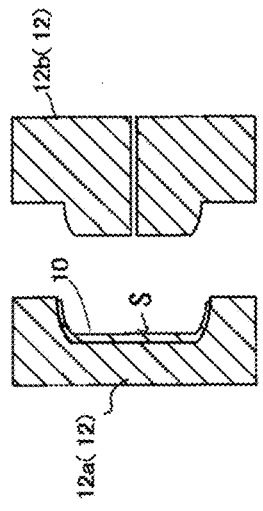
Figure 4C:
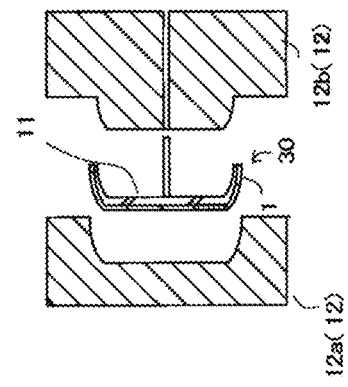

Next, as shown in FIG. 4B, the movable mold 12a and the fixed mold 12b are clamped together. Then, as shown in FIG. 4C, the cavity c formed in a state in which the movable mold 12a and the fixed mold 12b are clamped together is filled with the molten resin 11a. More specifically, the injection portion body 13 of the injection molding machine is moved forward so as to bring the nozzle 13a into contact against the resin inlet 14 formed in the fixed mold 12b, and the molten resin 11a containing in the cylinder 13b is injected into the cavity c using the in-line screw 13c, whereby the cavity c is filled with the molten resin 11a under a predetermined pressure.

The above-described injection of the molten resin 11a is performed under high temperature and pressure. Accordingly, when a print portion formed on a light-emitting display sheet comes into contact with a molten resin in a injection step, a print portion is likely to be melted by a heat and a pressure of a molten resin, and a outline thereof is likely to be deformed and thus be obscure. With the light-emitting display sheet according to the present embodiment, the print layer including the print portion is formed between the first surface of the first fiber base material layer and the surface material layer. Therefore, when the light-emitting display sheet is subjected to injection molding in order to integrate the light-emitting display sheet with the injection-molded body, the print portion is less likely to come into contact with the molten resin since the print portion is protected by the first fiber base material layer having a low thermal conductivity. Accordingly, the outline of the print portion is less likely to be deformed, and the print portion is less likely to be blurred.

Figure 4D:
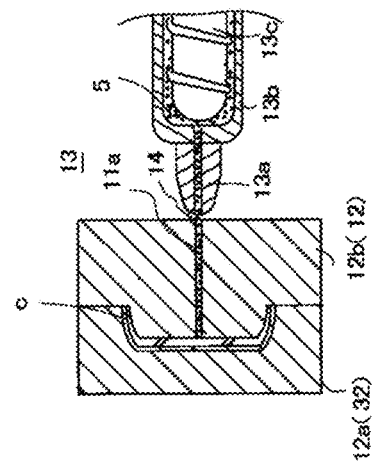

Then, the light-transmissive resin layer 11 molded in the cavity c formed as a result of the movable mold 12a and the fixed mold 12b being clamped together, and the light-emitting display sheet 10 stacked on the light-transmissive resin layer 11 are cooled for a predetermined time while being integrated with each other. Thereafter, as shown in FIG. 4D, the movable mold 12a and the fixed mold 12b are opened, and a light-emitting display member 30 in which the molded light-transmissive resin layer 11 and the light-emitting display sheet 1 stacked on the light-transmissive resin layer 11 are integrated with each other is removed.

The light-emitting display member described thus far is used as a member that forms a light-emitting display device, which will be described next, in which a light-emitting device is disposed on the light-transmissive resin layer side.

[Light-Emitting Display Device]

Next, an embodiment of the light-emitting display device will be described. The light-emitting display device according to the present embodiment includes the above-described light-emitting display member, and a light-emitting device disposed on the light-transmissive resin layer side.

Figure 5:
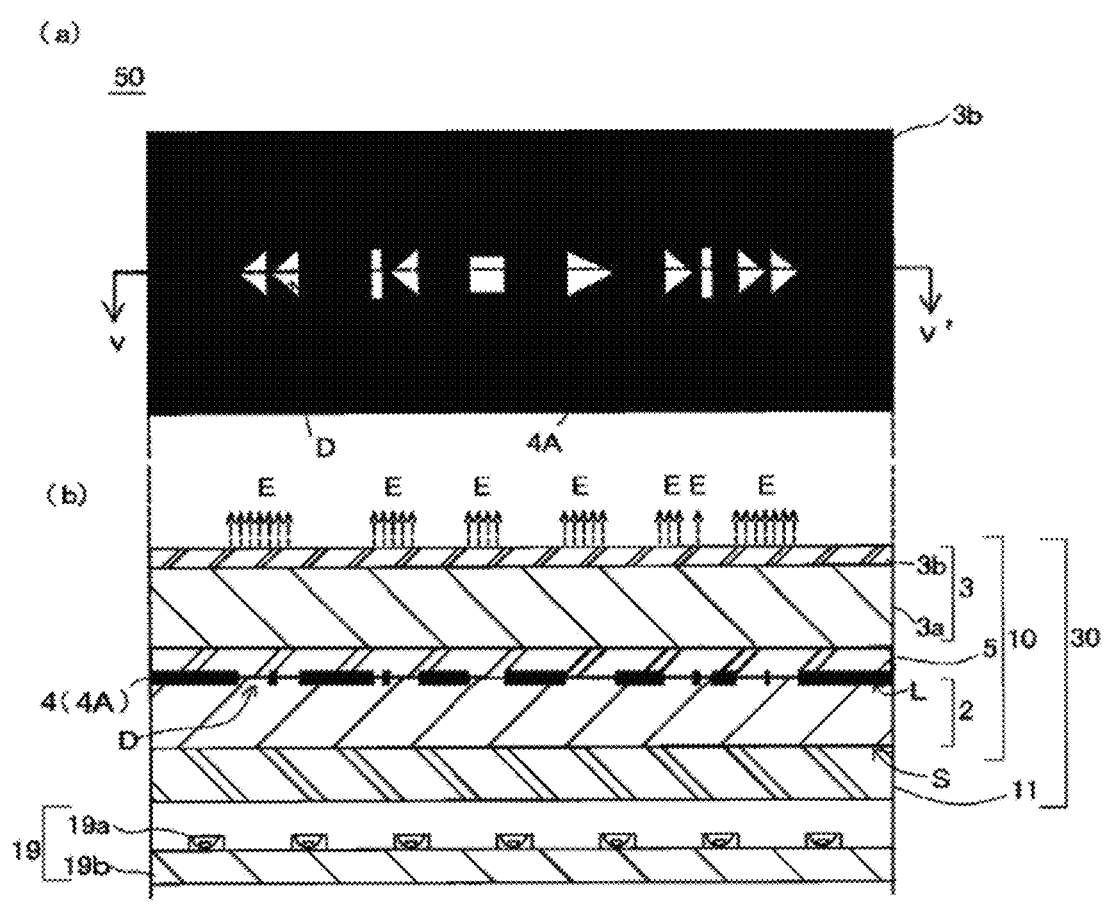
FIG. 5 shows schematic views of a light-emitting display device 50 according to an embodiment.

FIG. 5 shows schematic views of a light-emitting display device 50 in which the light-emitting display member 30 shown in FIG. 3 is used. RIG. 5(a) shows a schematic plan view of the light-emitting display device 50, and FIG. 5(b) shows a schematic cross-sectional view taken at the line V-V' in FIG. 5(a).

Referring to FIG. 5(b), the light-emitting display device 50 includes the light-emitting display member 30, and a light-emitting device 19 disposed on the light-transmissive resin layer 11 side of the light-emitting display member 30. The light-emitting device 19 is formed by mounting a light source 19a such as an LED device on a circuit board 19b, and the light source 19a emits light by receiving power supplied from a power supply (not shown). In addition to a light-emitting device including a mounting substrate on which a light source is mounted, an image display device such as a light-emitting display device may be used as the light-emitting device.

When the light source 19a of the light-emitting device 19 is turned on, light enters from the light-transmissive resin layer 11 of the light-emitting display member 30. Then, the light that has entered the light-transmissive resin layer 11 enters the first fiber base material layer 2 from the second surface S, which is the surface integrated with the light-transmissive resin layer 11 of the light-emitting display sheet 10, of the first fiber base material layer 2. Then, the light that has entered the first fiber base material layer 2 is reflected and diffused by the fiber surfaces inside the first fiber base material layer 2, and thereafter exits from the non-print portion D that is a light-transmissive portion formed on the print layer 4. On the other hard, the print portion 4A blocks transmission of light.

Then, the light that has exited from the non-print portion D further passes through the surface material layer 3, and exits from the outer surface of the surface material layer 3. In this manner, light E that has been emitted from the light-emitting device 19 is extracted from the outer surface of the surface material layer 3. The arrows indicate the light E that exits from the outer surface of the surface material layer 3. In this case, the light that has been extracted from the outer surface of the surface material layer 3 is emitted in a shape that matches the shape of the non-print Portion D formed on the print layer 4. For example, as shown in FIG. 5(*a*), shapes of icons indicating operation states of an audio device emerge on the outer surface on the outer surface side of the surface material layer 3.

When the surface material layer 3 is appropriately colored, the surface material layer 3 makes the first fiber base material layer 2 less visible from outside when the light source 19*a* is turned off.

The brightness of the light emitted by the light-emitting device 19 can be selected as appropriate according to the use, but is, fox example, preferably 20 to 200 lumen, and more preferably 30 to 100 lumen, because a light emission intensity that enables display using light to be sufficiently visible can be ensured.

Thus far, embodiments of the light-emitting display sheet, the light-emitting display member, and the light-emitting display device have been described. Next, as a representative example of the light-emitting display sheet, a light-emitting display sheet whose surface material layer is an artificial leather will be described in conjunction with a producing method thereof.

The fiber base material used as the first fiber base material layer or the second fiber base material layer that forms the light-emitting display sheet is a sheet material that includes a fiber structure such as a non-woven fabric, a woven fabric, and a knitted fabric, and in which an elastic polymer is impregnated into voids of the fiber structure if necessary. Among the fiber structures, a non-woven, fabric, in particular, a non-woven fabric of ultrafine fibers having an average fineness of 1.0 dtex or less is preferable, because the apparent density can be easily increased by increasing the fiber density, and the surface can be easily smoothed by reducing the density unevenness of the fibers. In the following, a case where a fiber base material including a non-woven fabric of ultrafine fibers is used will be described in detail as a representative example.

The non-woven fabric of ultrafine fibers is obtained, for example, by subjecting ultrafine fiber-generating fibers such as island-in-the-sea (matrix-domain) conjugated fibers to entangling, and then to ultrafine fiber-generation. In the present embodiment, a case where island-in-the-sea conjugated fibers are used will be described in detail. Note that, in place of island-in-the-sea conjugated fibers, ultrafine fiber-generating fibers other than island-in-the-sea conjugated fibers may be used, or ultrafine fibers may be directly spun without using ultrafine fiber-generating fibers. Specific examples of the ultrafine fiber-generating fibers other than island-in-the-sea conjugated fibers include strip/division-type fibers in which a plurality of ultrafine fibers are lightly bonded immediately after being spun, and separated by a mechanical operation, to form a plurality of ultrafine fibers, and petal-shaped fibers obtained by alternately assembling a plurality of resins in a petal shape in a melt spinning process.

In production of a non-woven fabric of ultrafine fibers, first, a thermoplastic resin constituting a sea component (matrix component), which can be selectively removed, of island-in-the-sea conjugated fibers, and a thermoplastic resin constituting an island component (domain component), which is a resin component for forming ultrafine fibers, of the island-in-the-sea conjugated fibers are melt spun and then drawn, thus producing island-in-the-sea conjugated fibers.

As the thermoplastic resin for the sea component, a thermoplastic resin that differs from the resin for the island component in solubility in a solvent or in decomposability in a decomposition agent is selected. Specific examples of the thermoplastic resin constituting the sea component include water-soluble polyvinyl alcohol-based resins, polyethylene, polypropylene, polystyrene, ethylene-propylene resins, ethylene-vinyl acetate resins, styrene-ethylene resins, and styrene-acrylic resins.

For the thermoplastic resin that defines the island components and that constitutes the resin component forming the ultrafine fibers, any resin capable of forming island-in-the-sea conjugated fibers and ultrafine fibers can be used without any particular limitation. Specific examples include: aromatic polyesters such as polyethylene terephthalate (PET), isophthalic acid-modified PET, sulfoisophthalic acid-modified PET, polybutylene terephthalate, and polyhexamethylene terephthalate; aliphatic polyesters such as polylactic acid, polyethylene succinate, polybutylene succinate, polybutylene succinate adipate, and a polyhydroxybutyrate-polyhydroxyvalerate resin; polyamides such as polyamide 6, polyamide 66, polyamide 10, polyamide 11, polyamide 12, and polyamide 6-12; and polyolefins such as polypropylene, polyethylene, polybutene, polymethylpentene, and a chlorine-based polyolefin. These may be used alone, or in a combination of two or more.

Examples of the production method of the non-woven fabric of ultrafine fibers include a method in which island-in-the-sea conjugated fibers are melt spun to produce a web, and the web is subjected to entangling, and thereafter the sea component is selectively removed from the island-in-the-sea conjugated fibers, to form ultrafine fibers. Examples of the production method of the web include a method in which filaments of the island-in-the-sea conjugated fibers that have been spun by spunbonding or the like are collected on a net, without being cut, to form a filament web, and a method in which filaments are cut into staples to form a staple web. Among these, a filament web is particularly preferable in that the apparent density can be easily increased by increasing the fiber density, and the surface can be easily smoothed by reducing the density unevenness of the fibers. The formed web may be subjected to fusion bonding in order to impart shape stability thereto.

Note that a filament means a continuous fiber, rather than a staple that has been intentionally cut after being spun. More specifically, a filament means a fiber other than a staple that has been intentionally cut so as to have a fiber length of about 3 to 80 mm, for example. The fiber length of the island-in-the-sea conjugated fibers before being subjected to the ultrafine fiber generation is preferably 100 mm or more, and may be several meters, several hundred meters, several kilometers, or more, as long as the fibers are technically producible and are not inevitably cut during the production processes. Note that some of the filaments may be inevitably cut into staples during the production process due to needle punching during entanglement, or surface buffing, which will be described later.

In any of the processes until, the sea component of the island-in-the-sea conjugated fibers is removed to form ultrafine fibers, entangling and fiber shrinking treatment such as heat shrinking using water vapor may be performed, whereby it is possible to densify the island-in-the-sea conjugated fibers. Examples of entangling include a method in which about 5 to 100 layers of the web are placed on top of each other, and then subjected to needle punching or high-pressure water jetting.

The sea component of the island-in-the-sea conjugated fibers is removed by dissolution or decomposition at an appropriate stage after the web has been formed. Through such removal by decomposition or removal by dissolution/extraction, the island-in-the-sea conjugated fibers are formed into ultrafine fibers, and a non-woven fabric of ultrafine fibers in the form of fiber bundles is formed. The non-woven fabric of ultrafine fibers in the form of fiber bundles may be subjected to heat shrinking, hot rolling, or hot pressing to further increase the apparent density thereof.

It is possible to apply the elastic polymer into the fiber structure by impregnating a solution or an emulsion of the elastic polymer into the fiber structure, and coagulating the elastic polymer.

Examples of the method for applying the elastic polymer into the fiber structure such as a non-woven fabric include a method involving impregnating a solution or an emulsion of the elastic polymer into the fiber structure, and subsequently coagulating the elastic polymer. As the method for impregnating a solution or an emulsion of the elastic polymer into the fiber structure, it is preferable to use dip-nipping in which a treatment of dipping the fiber structure in the solution or the emulsion so as to achieve a predetermined impregnated state, and nipping the fiber structure using a press roll or the like is performed once or a plurality of times. As another method, it is possible to use bar coating, knife coating, roll coating, comma coating, spray coating, or the like.

The content ratio of the elastic polymer in the fiber base material is preferably 3 to 40 mass %, more preferably 8 to 35 mass %, and particularly preferably 12 to 30 mass %, in view of the fact that the apparent density of the fiber base material is increased by increasing the fiber density, and the ink used for printing the print portion is likely to appropriately permeate and adhere by capillary action.

In this manner, a fiber base material is obtained. If necessary, the obtained fiber base material may be subjected to thickness adjustment through slicing, buffing, or the like. Also, the fiber base material may be further pressed, thus adjusting the apparent density thereof. Specifically, the fiber base material is pressed at room temperature, or hot pressed under heating to reduce voids in the base material of the fiber base material layer, thus increasing the fiber density of the fiber structure. Although the means for pressing is not particularly limited, a manual pressing machine or a roll pressing machine is preferably used, for example.

In the case of performing pressing, the pressing pressure is preferably about 5 to 20 MPa, and more preferably 6 to 15 MPa, from the viewpoint of maintaining the appearance quality. In the case of using hot pressing, the set temperature of the pressing plate is preferably 100 to 150° C., and more preferably 110 to 120° C., from the viewpoint of maintaining the appearance quality. In this manner, the apparent density of the fiber base material can be adjusted.

In order to smooth the surface of the fiber base material on which the light-blocking layer is to be printed, the surface of the fiber base material that is be printed may be smoothed through buffing. As for the surface roughness of the first surface L, the arithmetic mean height Sa is preferably 3 to 20 µm, as measured based on ISO 25178. Note that the arithmetic mean height (Sa) as measured based on ISO 25178 is a parameter representing the mean of absolute values of the height differences of various points with respect to the mean plane of the surface. When the arithmetic mean height Sa of the first surface L is too high, the surface on which the print portion is to be printed is excessively fuzzed and thus lacks smoothness, so that the ink is diffused and tends to be less likely to accurately adhere to the printed surface. When the arithmetic mean height Sa of the first surface L is too low, the anchor effect is less likely to be exhibited after application of the ink, and thus the fixability of the ink tends to be reduced. In order to smooth the surface, the first surface L may be provided with a coat layer having a thickness of about 5 to 80 µm.

In this manner, a fiber base material is obtained. Then, the print portion is printed on one surface of the obtained fiber base material using the ink. The print portion is formed by being printed, using an ink, a symbol such as a character and an icon, a pattern, and/or an image that is to be displayed with light emission on one surface of the fiber base material, or by forming a non-print portion without performing printing. Examples of the printing method used for printing include, but are not particularly limited to, screen printing, gravure printing, and inkjet printing. Among these, screen printing is preferable in terms of mass productivity since it allows the ink to be stably coated by a relatively low-cost process.

The viscosity of the ink used for printing can be designed in a preferable range according to the printing method. For screen printing, the viscosity of a coating ink diluted with a solvent is preferably about 10 to 100 Pa·sec, from the viewpoint of an appropriate permeation into the fiber base material.

In this manner, a fiber base material including a print layer including the printed print portion serving as a light-blocking layer, and the unprinted non-print portion that transmits light therethrough is formed. Then, the surface material is stacked or the surface of the fiber base material on which the print layer is formed.

Examples of the method for stacking the surface material on the surface of the fiber base material on which the print layer is formed include a method in which a superposed body in which an adhesive is interposed between the surface material and the surface of the fiber base material on which the print layer is formed is subjected to hot pressing, thereby bonding the fiber base material and the surface material to each other using the adhesive.

Examples of the artificial leather, which is a representative example of the surface material, include a grain-finished artificial leather obtained by stacking the surface resin layer on one surface of the fiber base material as described above, and a suede-like or nubuck-like napped artificial leather obtained by forming napped fibers on one surface of the fiber base material by napping.

The grain-finished artificial leather is obtained by forming, on one surface of the fiber base material, a surface resin layer containing an elastic polymer having a light transmitting property such as polyurethane by a method such as dry forming or direct coating. The napped artificial leather is formed by napping in which one surface of the fiber base material is buffed with sand paper, emery paper, or the like.

Examples of the resin for forming the surface resin layer of the grain-finished artificial leather include various polyurethanes such as a polycarbonate-based polyurethane, a polyester-based polyurethane, and a polyether-based polyurethane; an acrylic elastic body; a polyurethane acrylic composite elastic body; a polyvinyl chloride elastic body; and synthetic rubbers such as a silicone rubber; all of which have a light transmitting property. These may be used alone, or in a combination of two or more. Among these, polyurethanes are preferable because of the excellent mechanical properties such as abrasion resistance and bending resistance.

Dry forming is a method in which a resin film containing an elastic polymer is formed on a support base material such as release paper, subsequently an adhesive is applied to the surface of the resin film, which is then attached, and bonded through pressing if necessary, to the surface of the fiber base material on which the print layer has been formed, and the release paper is released, to form a surface resin layer having a light transmitting property. Direct coating is a method in which a liquid resin or a resin solution containing an elastic polymer is directly applied to the surface of the fiber base material on which the print layer has been formed, followed by curing, to form a surface resin layer.

The adhesive used for forming the adhesion layer in dry forming is not particularly limited. For example, for polyurethane, a polyurethane adhesive is preferably used. The thickness of the adhesion layer is not particularly limited, but is preferably 0.03 to 0.3 mm, and more preferably 0.05 to 0.2 mm.

When the surface material has thermal softening properties, bonding may be achieved by thermocompression bonding without using art adhesive.

In the light-emitting display sheet obtained in this manner, the print layer including the printed print portion serving as a light-blocking layer and the unprinted non-print portion that transmits light therethrough is sandwiched between the first fiber base material layer and the surface material layer. Accordingly, when the light-emitting display sheet is subjected to injection molding in order to integrate the light-emitting display sheet with an injection-molded body, a phenomenon in which the print portion is melted and deformed is less likely to occur. The light-emitting display sheet, or the light-emitting display device using the light-emitting device according to the present embodiment can form a surface that provides light emission display for home electrical appliances, automobiles, aircrafts, vessels, and interior parts of buildings.

EXAMPLES

Hereinafter, the present invention will be described in further detail by way of examples. It should be appreciated that the scope of the invention is by no means limited to the examples.

Example

A fiber base material A having a thickness of 0.35 mm and an apparent density of 0.50 g/cm$^3$, and including modified PET ultrafine fibers with an average fineness of 0.9 dtex and a Tg of 100° C. and polyurethane was prepared as a fiber base material used for a first fiber base material layer. The arithmetic mean height Sa of a first surface of the fiber base material A was 7.6 μm, and the arithmetic mean height Sa of a second surface thereof was 10.0 μm. Then, a print layer was printed on the first surface of the fiber base material A by screen printing. The printing was performed so as to form a print portion having an outline of a black grid pattern.

Meanwhile, a fiber base material B having a thickness of 0.35 mm and an apparent density of 0.50 g/cm$^3$ and including modified PET ultrafine fibers with an average fineness of 0.9 dtex and a Tg of 100° C. and polyurethane was prepared as a fiber base material used for a second fiber base material layer to form an artificial leather.

In addition, a 30 μm thick film of a silicone-modified polycarbonate-based polyurethane resin, serving as a grain-finished surface resin layer, was formed on a surface of grained release paper. Then, A 70 μm thick adhesion layer made of a polyurethane adhesive was stacked on a surface of the film of the silicone-modified polycarbonate-based polyurethane resin.

Then, a superposed body was formed in which the film of the silicone-modified polycarbonate-based polyurethane resin was superposed on the fiber base material B such that the adhesion layer faced one surface of the fiber base material B. Then, the superposed body was heated for 2 minutes at 30° C. Then, the release paper was released, to produce an artificial leather in which the fiber base material B and the film of the silicone-modified polycarbonate-based polyurethane resin were bonded to each other with the polyurethane adhesive.

Then, a superposed body was formed in which a 50 μm thick sheet of a polyurethane adhesive, which was a hot-melt adhesive, was disposed on the first surface of the fiber base material A on which the print layer was formed, and the fiber base material B of the artificial leather was superposed on the sheet. Then, the superposed body was pressed by a hot pressing machine having a surface temperature of 100° C., to produce a light-emitting display sheet in which the fiber base material A serving as the first fiber base material layer and the artificial leather were bonded to each other with the polyurethane adhesive.

Then, the light-emitting display sheet was subjected to hot press molding using a press mold for shaping the light-emitting display sheet into a shape corresponding to an injection molding mold, which will be described below, at a mold temperature of 100° C. and a pressing pressure of 4 MPa, thus molding a preform molded body.

Then, in-mold decorative injection molding was performed using the preform molded body of the light-emitting display sheet that had been trimmed into a predetermined shape. Specifically, in a state in which a movable mold and a fixed mold of an injection molding mold mounted on an electric injection molding machine (SE-100 manufactured by Sumitomo Heavy Industries, Ltd.) were opened, the preform molded body was disposed in alignment with a cavity-forming surface of the movable mold. Note that the preform molded body was disposed such that the artificial leather faced the cavity-forming surface. Then, the movable mold and the fixed mold were clamped together. Note that the cavity of the injection molding mold had a shape having a circular circumference and a trapezoidal cross section, and having a thickness of 3 mm, a diameter of 80 mm, and a height of 10 mm.

Then, an MBS resin was injected under the conditions of a resin temperature of 240° C. and a mold temperature of 40° C., thus filling the inside of the cavity. Then, after complete filling of the cavity, the molds were cooled, and thereafter opened. In this manner, a light-emitting display member in which a surface layer of the fiber base-material A serving as the first fiber base material layer of the light-emitting display sheet was integrated with a surface of the MBS resin molded body was obtained.

Figure 6:
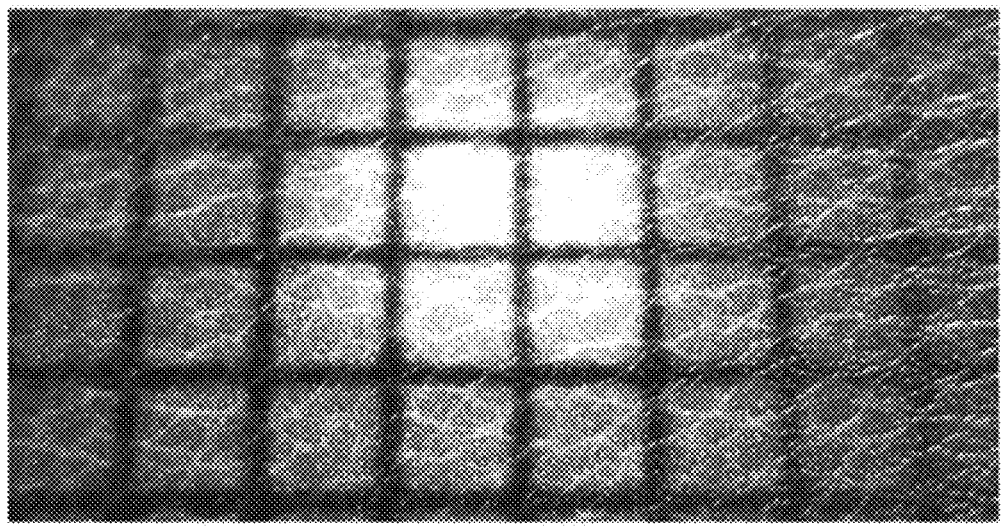
FIG. 6 shows a photograph that is an evaluation result of an example.

As a result of visually observing the print layer from the MBS resin molded body side of the obtained light-emitting display member, no deformation was observed in the outline of the print portion that formed the boundary between the print portion and the non-print portion. In addition, a light-emitting device, which was a circular LED device having a brightness of 40 lumen and a diameter of 3.5 mm, was disposed at a distance of 20 mm from the sample so as to face the MBS resin molded body side of the obtained light-emitting display member, then light from the light-emitting device was transmitted through the light-emitting display member, and a grid pattern due to light emission that appeared on the surface resin layer of the surface material layer was observed visually. FIG. 6 shows a photograph taken at this time.

Comparative Example

A light-emitting display sheet and a light-emitting display member was produced in the same manner as in Example except that a superposed body was formed in which the fiber base material B side of the artificial leather was superposed so as to face the second surface of the fiber base material A on which the print layer was not formed, instead of forming the superposed body in which the fiber base material B side of the artificial leather was superposed so as to face the first surface of the fiber base material A on which the print layer was formed.

Figure 7:
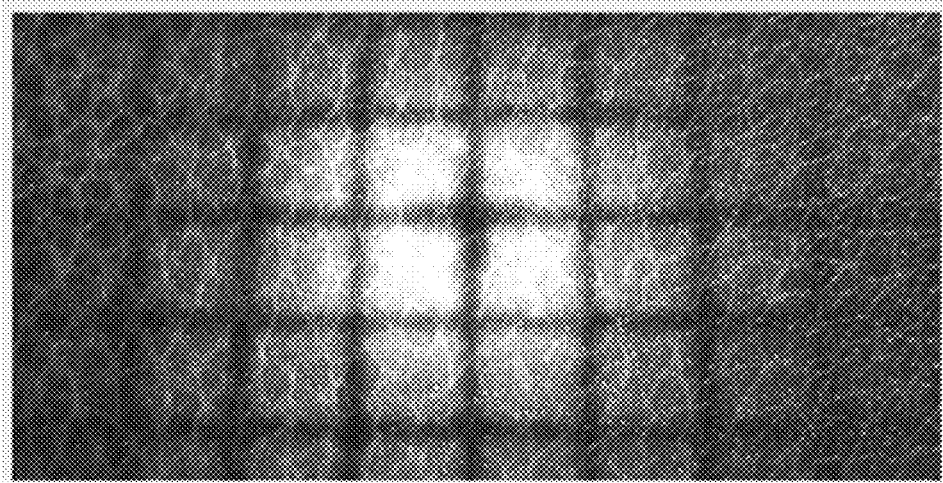
FIG. 7 shows a photograph that is an evaluation result of a comparative example.

Then, as a result of visually observing the print layer from the MBS resin molded body side of the obtained light-emitting display member, a significant deformation was observed in many locations of the outline of the grid pattern of the print portion. In addition, as in Example, light from the light-emitting device was transmitted through the light-emitting display member, and the grid pattern due to light emission that appeared on the surface of the surface material layer was observed visually. FIG. 7 shows a photograph taken at this time.

In the light-emitting device in which the light-emitting display member obtained in Example according to the present invention was used, the outline of the grid of the print portion was not deformed, and the outline was clear, as shown in FIG. 6. As a result, the contrast of light emission was high. On the other hand, in the light-emitting device in which the light-emitting display member obtained in Comparative Example was used, the outline of the grid of the print portion was deformed, and many portions thereof were observed to be unclear, as shown in FIG. 7.

Reference Signs List

2. . . . First fiber base material layer
3. . . . Surface material layer
3a . . . . Second fiber base material layer
4. . . . Print layer
4A. . . . Print portion
5. . . . Adhesion layer
10, 20. . . . Light-emitting display sheet
11. . . . Light-transmissive resin layer
11a . . . . Molten resin
12. . . . Injection molding mold
12a . . . . Movable mold
12b . . . . Fixed mold
13. . . . Injection portion body
19. . . . Light-emitting device flight-emitting member)
19a . . . . Light source
19b . . . . Circuit board
30. . . . Light-emitting display member
40. . . . Light-emitting display device
c. . . . . Cavity
i. Non-print portion (light-transmissive portion)
E. . . . Light
L. . . . First surface
S. . . . Second surface

The invention claimed is:

1. A light-emitting display sheet, comprising:
a first fiber base material layer; and
a surface material layer stacked on the first fiber base material layer,
wherein the first fiber base material layer comprises a fiber base material comprising a non-woven fabric of entangled ultrafine fibers having an average fineness of 1.0 dtex or less, and the first fiber base material layer includes a first surface facing the surface material layer, and a second surface opposite to the first surface, and
the light-emitting display sheet further comprises a print portion printed on the first surface having an outline and sandwiched between the first surface of the first fiber base material layer and the surface material layer.

2. The light-emitting display sheet according to claim 1, wherein the first fiber base material layer and the surface material layer are bonded to each other via an adhesion layer.

3. The light-emitting display sheet according to claim 1, wherein the first surface has an arithmetic mean height Sa of 3 to 20 μm, as measured based on ISO 25178.

4. The light-emitting display sheet according to claim 1, wherein the first fiber base material layer comprises a fiber base material that comprises a non-woven fabric of entangled ultrafine fibers having an average fineness of 1.0 dtex or less, and an elastic polymer impregnated into the non-woven fabric, and that has an apparent density of 0.3 g/cm$^3$ or more.

5. The light-emitting display sheet according to claim 1, wherein the surface material layer comprises a second fiber base material layer, and
the print portion is sandwiched between the first fiber base material layer and the second fiber base material layer.

6. The light-emitting display sheet according to claim 5, wherein the surface material layer further comprises a decoration layer stacked on an outer surface side of the second fiber base material layer.

7. The light-emitting display sheet according to claim 6, wherein the decoration layer is a leather grain-like resin layer.

8. The light-emitting display sheet according to claim 1, wherein the surface material layer comprises at least one selected from the group consisting of a textile material, a wood sheet, a stone sheet, a metal sheet, and a resin sheet.

9. A light-emitting display member, comprising:
the light-emitting display sheet according to claim 1; and
a light-transmissive resin layer integrated on the second surface side.

10. The light-emitting display member according to claim 9, wherein the light-transmissive resin layer is an injection-molded body.

11. A light-emitting display device, comprising:
the light-emitting display member according to claim 9; and
a light-emitting device disposed on the light-transmissive resin layer side.

12. The light-emitting display sheet according to claim 5, wherein both the first fiber base material layer and the second fiber base material layer comprise a fiber base material that comprises a non-woven fabric of ultrafine fibers having an average fineness of 1.0 dtex or less, and an elastic polymer impregnated into the non-woven fabric, and that has an apparent density of 0.3 g/cm$^3$ or more.

13. The light-emitting display sheet according to claim 12, wherein the first fiber base material layer and the second fiber base material layer are bonded to each other via an adhesion layer.

14. The light-emitting display sheet according to claim 12, wherein the surface material layer further comprises a decoration layer stacked on an outer surface side of the second fiber base material layer.

15. The light-emitting display sheet according to claim 12, wherein an outer surface side of the second fiber base material layer comprises napped ultrafine fibers being formed by buffing the outer surface side of the second fiber base material layer.

16. A light-emitting display member, comprising:
the light-emitting display sheet according to claim 12; and a light-transmissive resin layer integrated on the second surface side.

17. A light-emitting display device, comprising:

the light-emitting display member according to claim 16; and a light-emitting device disposed on the light-transmissive resin layer side.

18. A method for producing a light-emitting display member, the method comprising:

accommodating the light-emitting display sheet according to claim 1 in a cavity of an injection-molding mold, and clamping the mold; and injection molding a light-transmissive resin layer, thereby integrating the light-transmissive resin layer on the second surface side of the first fiber base material layer that forms the light-emitting display sheet accommodated in the injection-molding mold.

* * * * *